(12) United States Patent
Ye et al.

(10) Patent No.: US 9,921,359 B2
(45) Date of Patent: Mar. 20, 2018

(54) LIGHT SOURCE MODULE

(71) Applicant: HARVATEK CORPORATION, Hsinchu (TW)

(72) Inventors: Zhi-Ting Ye, Hsinchu (TW); Shyi-Ming Pan, Hsinchu (TW); Chia-Hung Pan, Hsinchu (TW)

(73) Assignee: HARVATEK CORPORATION, Hsinchu (TW)

( * ) Notice: Subject to any disclaimer, the term of this patent is extended or adjusted under 35 U.S.C. 154(b) by 0 days.

(21) Appl. No.: 15/435,299

(22) Filed: Feb. 17, 2017

(65) Prior Publication Data

US 2018/0031755 A1     Feb. 1, 2018

(30) Foreign Application Priority Data

Jul. 26, 2016   (TW) ............................. 105211295 U
Oct. 24, 2016   (TW) ............................. 105134340 A

(51) Int. Cl.
*F21V 7/04*   (2006.01)
*F21V 8/00*   (2006.01)

(52) U.S. Cl.
CPC ........... *G02B 6/0036* (2013.01); *G02B 6/005* (2013.01); *G02B 6/0055* (2013.01)

(58) Field of Classification Search
CPC ..... G02B 6/005; G02B 6/0036; G02B 6/0055
See application file for complete search history.

(56) References Cited

U.S. PATENT DOCUMENTS

2002/0043926 A1*   4/2002   Takahashi ............... C03C 3/045
                                                    313/503

* cited by examiner

*Primary Examiner* — Ali Alavi
(74) *Attorney, Agent, or Firm* — ScienBiziP, P.C.

(57) ABSTRACT

A light source module includes a light guide plate, a reflecting film, and a plurality of edge-type light emitting diode (LED) units. Grooves are defined in a lower surface of the light guide plate. The reflecting film is below the lower surface and covers the entire lower surface and the grooves. An air gap is defined between the reflecting film and the lower surface. The edge-type LED units are located in the grooves. Each edge-type LED unit includes an LED chip, a wavelength converting layer, and a light reflecting layer. Light emitted is converted by the wavelength converting layer, reflected towards sidewalls of the wavelength converting layer, and transmitted to the lower surface. The reflecting film reflects light that enters the air gap towards an upper surface of the light guide plate, enabling uniform emission of light from the upper surface.

8 Claims, 4 Drawing Sheets

_US 9,921,359 B2_

LIGHT SOURCE MODULE

CROSS-REFERENCE TO RELATED APPLICATIONS

This application claims all benefits accruing under 35 U.S.C. § 119 from Taiwan Patent Application No. 105211295, filed on Jul. 26, 2016 and Taiwan Patent Application No. 105134340, filed on Oct. 24, 2016, the content of which is hereby incorporated by reference.

FIELD

The present disclosure relates to light sources, and more particularly to a planar light source module.

BACKGROUND

Light emitting diodes (LED) are widely applied in lighting, such as general lighting or automotive lighting, backlight module, and other fields. Generally, an LED planar light source module includes an outer frame where a reflecting film, a light guide plate, a diffusion plate, and a plurality of light reflecting films are arranged and stacked one by one. The LED light source is arranged on a side of the light guide plate. However, since the light guide plate is attached to the outer frame, lines of darkness are present in seams between the light guide plate and the outer frame, affecting the appearance. Moreover, due to the presence of the outer frame, such LED planar light source module is not capable of achieving a frameless appearance. Therefore a light source module without an outer frame is desired to achieve a frameless appearance.

BRIEF DESCRIPTION OF THE DRAWINGS

The present disclosure is illustrated by way of exemplary embodiments and accompanying drawings.

DETAILED DESCRIPTION

Figure 1:
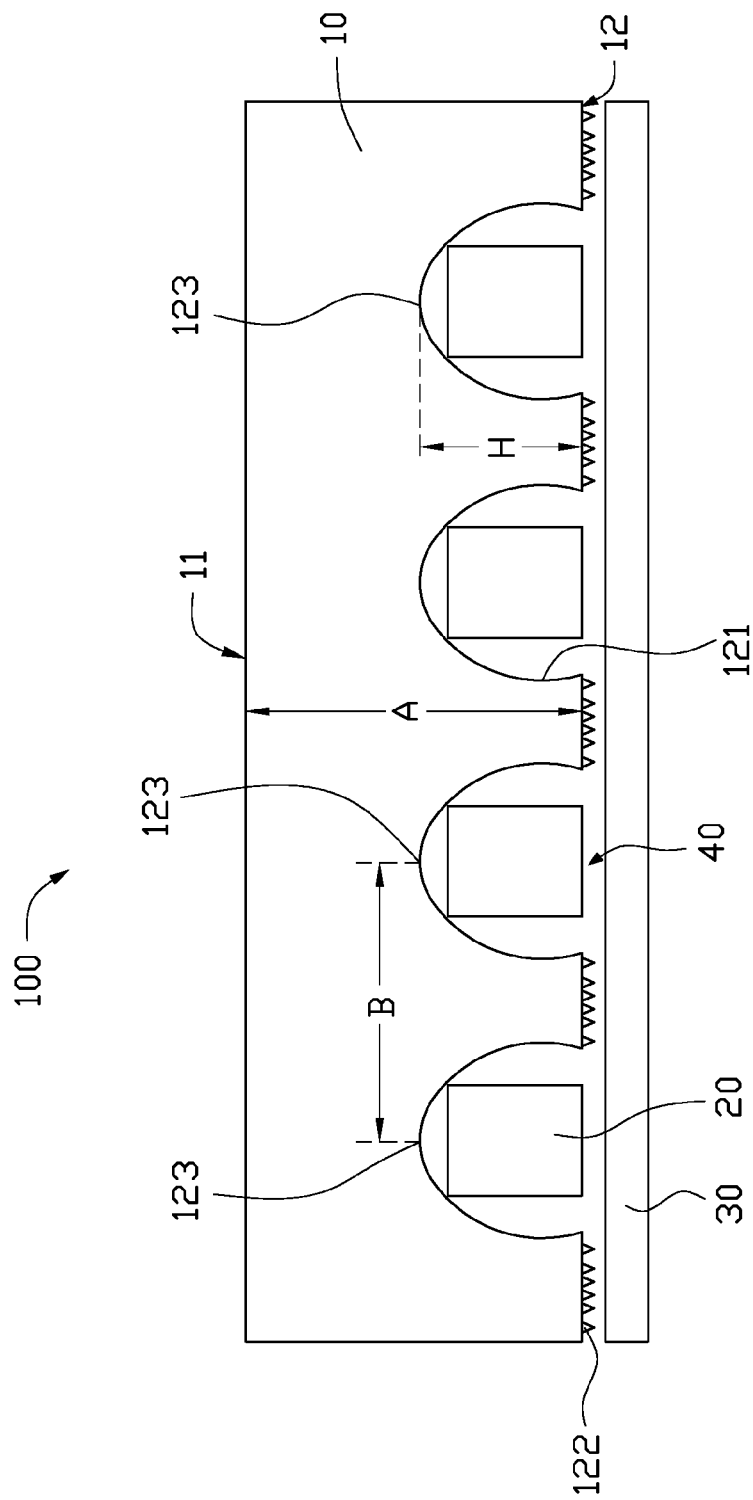
FIG. 1 is a planar view of a structure of an exemplary embodiment of a light source module of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented. The term "substantially" means essentially conforming to the particular dimension, shape, or other feature that the term modifies, such that the component need not be exact. For example, "substantially cylindrical" means that the object resembles a cylinder, but may have one or more deviations from a true cylinder. The term "coupled" means connected, whether directly or indirectly through intervening components, and is not necessarily limited to physical connections. The connection may be such that the objects are permanently connected or releasably connected. The term "connecting" is defined as linked, whether directly or indirectly through intervening components, and is not necessarily limited to physical linking. The connection can be such that the objects are permanently connected or releasably connected. The term "comprising" or "containing" when utilized, means "including, but not necessarily limited to"; it specifically indicates open-ended inclusion or membership in the so-described combination, group, series and the like.

Figure 2:
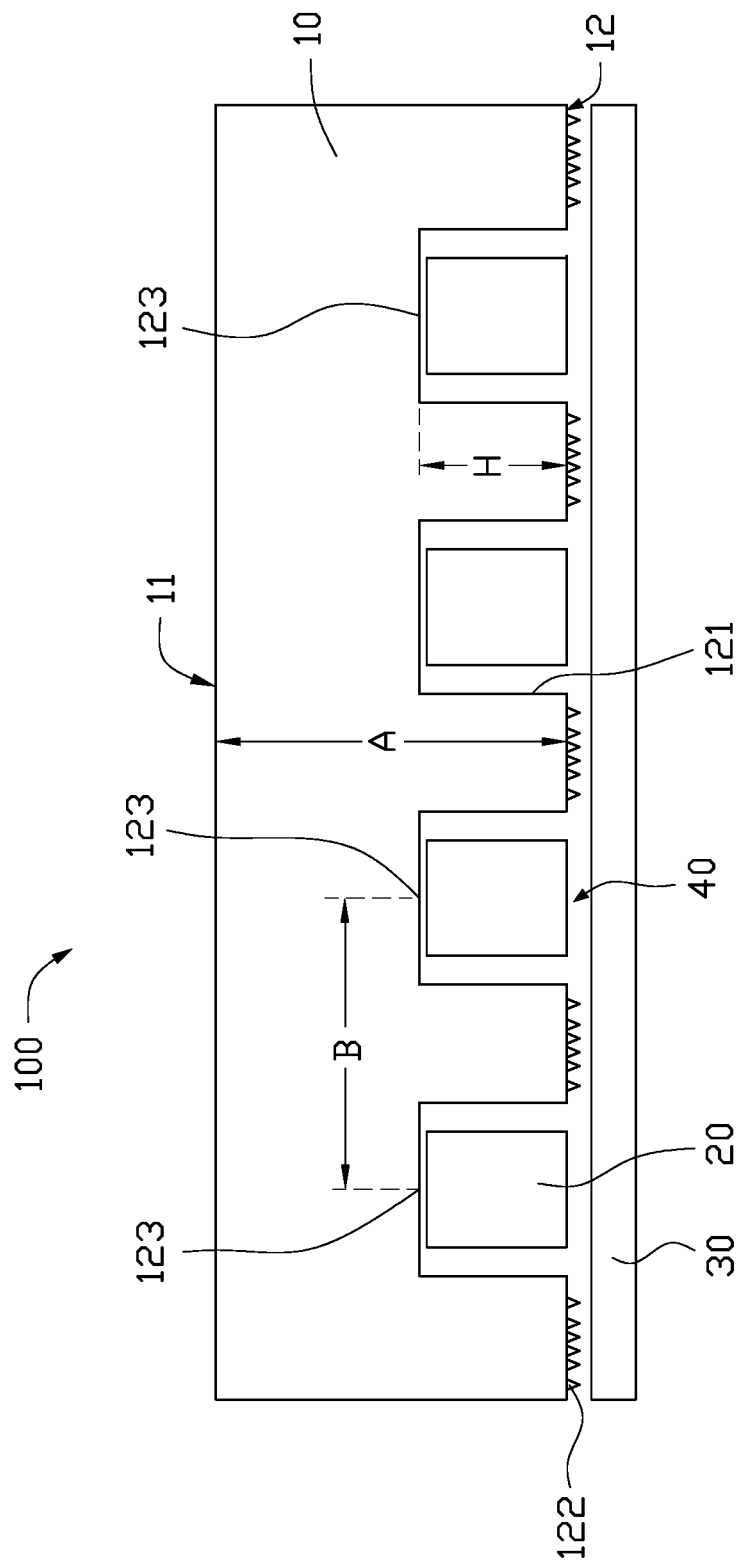
FIG. 2 is a planar view of the structure of another exemplary embodiment of the light source module of the present disclosure.

The present disclosure provides a light source module. FIG. 1 and FIG. 2 show two exemplary embodiments of the light source module 100 of the present disclosure. The light source module 100 includes a light guide plate 10, a plurality of edge-type light emitting diode (LED) units 20, and a reflecting film 30.

The light guide plate 10 is plate-like and substantially rectangular, for a slim planar light source module. The light guide plate 10 has an upper surface 11 and a lower surface 12. The upper surface 11 and the lower surface 12 are on two opposite sides of the light guide plate 10 facing away from one another. The upper surface 11 is a smooth surface, and the lower surface 12 extends substantially parallel to the upper surface 11. A plurality of grooves 121 is defined in the lower surface 12, and the grooves 121 are uniformly spaced apart from one another. In the present exemplary embodiments, each of the plurality of grooves 121 has a depth H. The depth H is a distance between a terminal point 123 of the groove 121 and the lower surface 12. The depth H is in a range of about 0.4-1.2 millimeters. A spacing B is a distance between two terminal points 123 of two adjacent grooves 121. The light guide plate 10 has a thickness A, and the thickness A is a distance between the upper surface 11 and the lower surface 12. A ratio between the thickness A to the spacing B is 1:1-2:1. A cross-sectional shape of the plurality of grooves 121 may be set as required. In the exemplary embodiment shown in FIG. 1, the cross-sectional shape of the plurality of grooves 121 is semi-elliptical. In the exemplary embodiment shown in FIG. 2, the cross-sectional shape of the plurality of grooves 121 is quadrilateral. In other exemplary embodiments, the cross-sectional shape of the plurality of grooves 121 may be hemispherical or arcuate.

Figure 3:
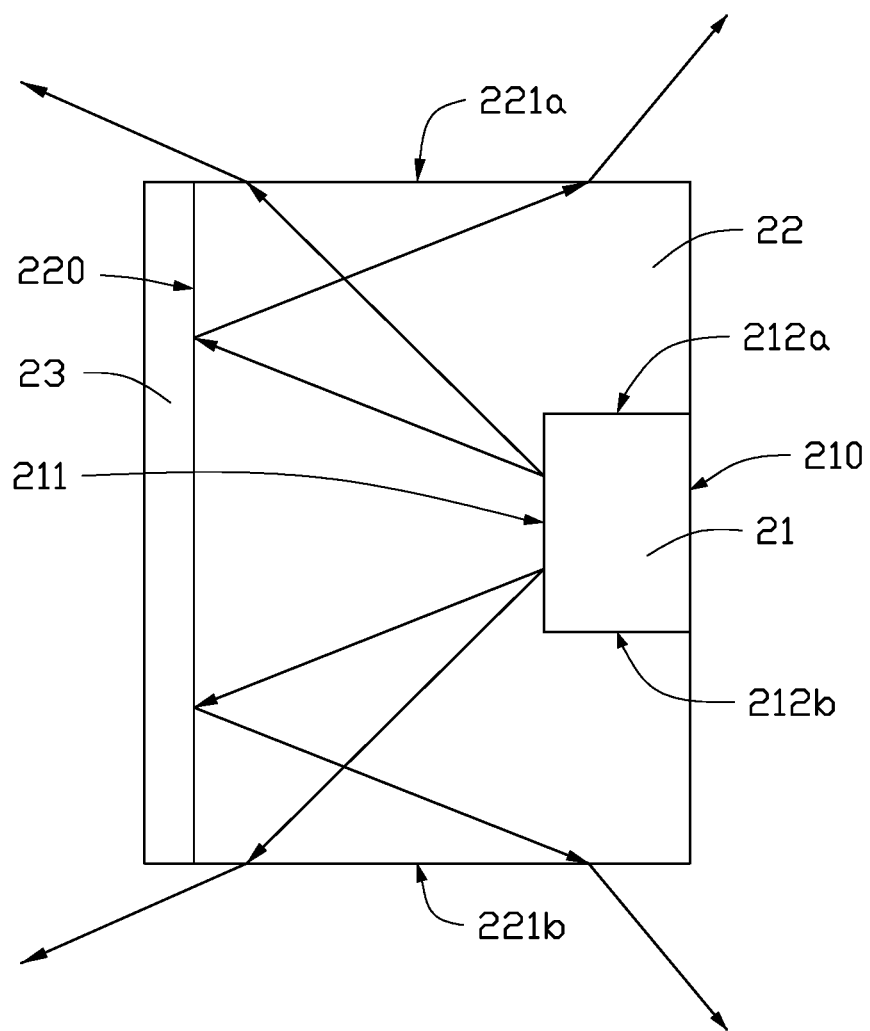
FIG. 3 is a schematic diagram illustrating an edge-type light emitting diode unit of the light source modules of FIG. 1 and FIG. 2.

Each of the plurality of edge-type LED units 20 is located in a groove of the plurality of grooves 121. The plurality of edge-type LED units 20 may be fabricated by a Chip Scale Package (CSP). Referring to FIG. 3, each of the plurality of edge-type LED units 20 includes an LED chip 21, a wavelength converting layer 22, and a light reflecting layer 23. The LED chip 21 has a bottom surface 210, a light emitting surface 211, and at least two first sidewalls 212. The bottom surface 210 and the light emitting surface 211 are on two opposite sides of the LED chip 21 facing away from one another. The first sidewalls 212 connect the bottom surface 210 and the light emitting surface 211. The wavelength converting layer 22 is located on the light emitting surface 211 and covers the first sidewalls 212. The wavelength converting layer 22 has a top surface 220 and at least two second sidewalls 221. The top surface 220 faces toward the light emitting surface 211, and the second sidewalls 221 face toward the first sidewalls 211. In the present exemplary embodiment, the first sidewalls 212 include at least two sidewalls 212a and 212b, and the second sidewalls 221 include at least two second sidewalls 221a and 221b. The second sidewall 221a faces toward the first sidewall 212a, the second sidewall 221b faces toward the first sidewall 212b. The light reflecting layer 23 is located on the top surface 220 of the wavelength converting layer 22. The top surface 220 is located between the LED chip 21 and the terminal point 123 of each groove 121. The light reflecting layer 23 may be made of titanium dioxide, silicon dioxide, teflon, or calcium carbonate.

The LED chip 21 emits light through the light emitting surface 211. The wavelength converting layer 22 converts the emitted light to light with a specific range of wavelengths. The light reflecting layer 23 reflects the converted light toward the second sidewalls 221 of the wavelength converting layer 22, thus the reflected light is transmitted through the second sidewalls 221 to the lower surface 12. In the present exemplary embodiments, the wavelength converting layer 22 is made of a fluorescent material.

Figure 4:
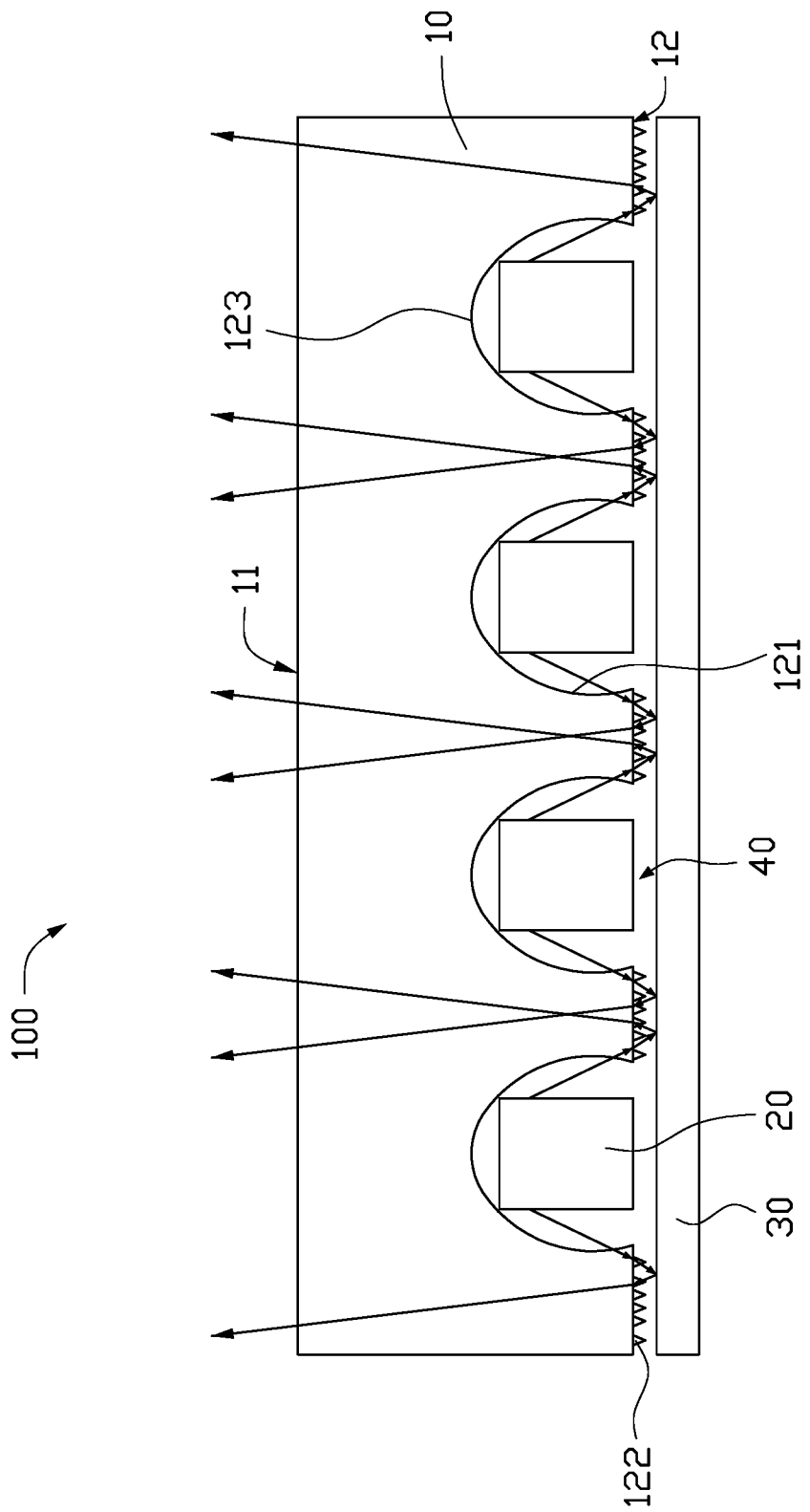
FIG. 4 is a schematic diagram illustrating the light source module shown in FIG. 1.

The reflecting film 30 is positioned below the lower surface 12. The reflecting film 30 covers the entire lower surface 12 and the plurality of grooves 121. An air gap 40 is defined between the reflecting film 30 and the lower surface 12. Referring to FIG. 4, light is transmitted through the air gap 40 from the lower surface 12, and is then reflected by the reflecting film 30 toward the upper surface 11 through the light guide plate 10. The reflected light is thus evenly transmitted through the upper surface 11. The reflecting film 30 may be a separate diffusion type reflecting film, which may be made of titanium dioxide, silicon dioxide, teflon (also named as polytetrafluoroethene, PTFE), or calcium carbonate.

In the present exemplary embodiments, a microstructure layer 122 is provided in the lower surface 12. The microstructure layer 122 includes a plurality of microstructures (not shown) for scattering light. The microstructures may be recessed or protruded relative to the lower surface 12.

Moreover, the plurality of microstructures may be arranged in a gradient distribution in a region between each two adjacent grooves 121 of the lower surface 12. A density of the microstructures closest to the groove 121 is less than a density of microstructures farthest away from the groove 121, thus further improving uniformity of the light transmitted through the upper surface 11. A cross-sectional shape of the plurality of microstructures may be set as required. For example, the cross-sectional shape of the microstructures may be triangular or semi-elliptical. It should be understood, in such a case, the reflecting film 30 is positioned below the microstructure layer 122, and the reflecting film 30 covers the entire microstructure layer 122 and the plurality of grooves 121.

The reflecting film 30 may be securely connected with the lower surface 12 by screws or other mechanical fixing methods. In one example, the reflecting film 30 has four corners and one screw is provided at each corner, while screw holes are provided in the lower surface 12 at corresponding positions, so that when the screws is locked into the screw holes, the reflecting film 30 is securely connected to the lower surface 12.

According to the above exemplary embodiments of the present disclosure, the light source module does not include an outer frame, so reducing or possibly eliminating lines of darkness and a clumsy appearance. Moreover, ultra-slim and frameless planar light source modules may be achieved based on the present disclosure.

The exemplary embodiments illustrated and described above are only examples of the present disclosure, which should not be considered as a limitation to the scope of the present disclosure. Many changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A light source module, comprising:
a light guide plate;
a reflecting film; and
a plurality of edge-type light emitting diode (LED) units;
wherein the light guide plate comprises an upper surface and a lower surface, the upper surface and the lower surface are on two opposite sides of the light guide plate facing away from one another, a plurality of grooves is defined in the lower surface, and the grooves are uniformly spaced apart from one another;
wherein the reflecting film is below the lower surface, the reflecting film covers the entire lower surface and the plurality of grooves, and an air gap is defined between the reflecting film and the lower surface; and
wherein each of the plurality of edge-type LED units is correspondingly located in one of the plurality of grooves, and each of the plurality of edge-type LED units comprises a LED chip, a wavelength converting layer, and a light reflecting layer;
wherein the LED chip comprises a bottom surface, a light emitting surface, and at least two first sidewalls; wherein the bottom surface and the light emitting surface are on two opposite sides of the LED chip facing away from one another, the at least two first sidewalls connect the bottom surface and the light emitting surface, and the LED chip emits light through the light emitting surface;
wherein the wavelength converting layer is on the light emitting surface of the LED chip and covers the at least two first sidewalls, the wavelength converting layer comprises a top surface and at least two second sidewalls, the top surface faces toward the light emitting surface, and the at least two second sidewalls face toward the at least two first sidewalls, the wavelength converting layer is configured to convert the emitted light from the LED chip to light with a specific range of wavelengths; and
wherein the light reflecting layer is on the top surface of the wavelength converting layer, the top surface is between the LED chip and a terminal point of the plurality of grooves, the light reflecting layer reflects the converted light toward the at least two second sidewalls of the wavelength converting layer, and the reflected light is transmitted through the at least two second sidewalls to the lower surface;
wherein the light transmitted through the air gap from the lower surface is reflected by the reflecting film toward the upper surface, so as to evenly transmitting the light through the upper surface.

2. The light source module of claim 1, wherein a microstructure layer is provided in the lower surface, the microstructure layer comprises a plurality of microstructures, each of the plurality of microstructures is recessed or protruded relative to the lower surface.

3. The light source module of claim 2, wherein the plurality of microstructures is arranged in a gradient distribution between each two adjacent grooves of the lower surface, a density of the microstructures close to the grooves is less than a density of the microstructures away from the grooves.

4. The light source module of claim 1, wherein each of the plurality of grooves comprises a depth between the terminal point of the groove and the lower surface, and the depth is in a range of 0.4-1.2 millimeters.

5. The light source module of claim 1, wherein the light guide plate comprises a thickness between the upper surface and the lower surface, a spacing B is a distance between two terminal points of two adjacent grooves of the plurality of grooves, and a ratio between the thickness to the spacing is 1:1-2:1.

6. The light source module of claim 1, wherein a cross-sectional shape of the plurality of grooves is substantially semi-elliptical, quadrilateral, or hemispherical.

7. The light source module of claim 1, wherein the reflecting film is a diffusion type reflecting film and is made of titanium dioxide, silicon dioxide, teflon or calcium carbonate.

8. The light source module of claim 1, wherein the light reflecting layer is made of titanium dioxide, silicon dioxide, teflon or calcium carbonate.

* * * * *